C. T. HENDERSON.
CONTROL SYSTEM.
APPLICATION FILED JULY 3, 1916.

1,252,902.

Patented Jan. 8, 1918.
2 SHEETS—SHEET 1.

INVENTOR.
Clark T. Henderson
BY Frank A. Hubbard
ATTORNEY

C. T. HENDERSON.
CONTROL SYSTEM.
APPLICATION FILED JULY 3, 1916.

1,252,902.

Patented Jan. 8, 1918.
2 SHEETS—SHEET 2.

INVENTOR.
Clark T. Henderson
BY
Frank A. Aubland
ATTORNEY

UNITED STATES PATENT OFFICE.

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

CONTROL SYSTEM.

1,252,802.

Specification of Letters Patent.   Patented Jan. 8, 1918.

Application filed July 3, 1916. Serial No. 107,298.

*To all whom it may concern:*

Be it known that I, CLARK T. HENDERSON, a citizen of the United States, residing at Milwaukee, in the county of Milwaukee and State of Wisconsin, have invented new and useful Improvements in Control Systems, of which the following is a full, clear, concise, and exact description, reference being had to the accompanying drawing, forming a part of this specification.

This invention relates to control systems, and more particularly to braking systems, for printing presses and other machines having a high inertia.

There is now a tendency to build printing presses and other machines for operation at considerably higher speeds than in the past, and the braking means heretofore employed are proving inadequate. Such machines have usually been braked dynamically by their driving motors, but when such machines are driven at the speeds now contemplated, a dynamic brake is unsatisfactory, among other reasons, because the same, when adjusted for the desired quick stopping imposes very heavy braking strains on the driving gears and subjects the controlled machine and gears to severe shocks upon the taking up of back lash in the latter. Also, in some instances friction brakes have been employed for such machines but the former have only provided for a substantially constant braking effect whereas such machines when driven at the speeds now contemplated are subject to such a wide variation in kinetic energy as to require a graduated braking effect substantially proportional to the kinetic energy to insure the desired quick and smooth stopping thereof. Thus, as the kinetic energy is proportional to the square of the speed, the braking effect must vary with the square of the speed.

The present invention has among its objects to provide a braking system for such machines which will produce a braking effect variable with the kinetic energy of the machine and at the same time eliminate the aforesaid shocks and strains.

A further object is to provide a braking system for producing through the medium of friction brakes, a distributed braking effect approximately proportional to the kinetic energy of the machine, such brakes being particularly adapted for distributed braking.

A still further object is to provide a braking system for printing presses and like machines including braking means for the supply roll or rolls.

Other objects and advantages of the invention will hereinafter appear.

The accompanying drawing schematically illustrates certain embodiments of the invention which will now be described, it being understood that those embodiments illustrated are susceptible of various modifications without departure from the scope of the accompanying claims.

Figure 1:
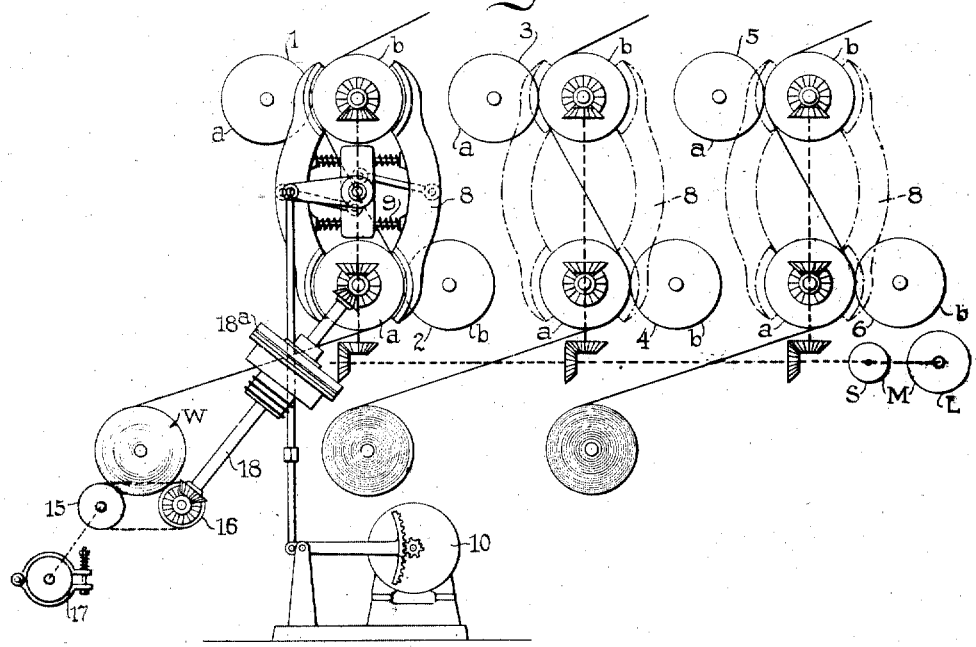
Figure 1 is a schematic view of a sextuple printing press and certain braking instrumentalities.

Referring to the press shown in Fig. 1, the same comprises six printing couplets 1 to 6 inclusive arranged vertically in pairs and each pair supplied with web from a roll W. The couplets are moreover arranged in an offset relation whereby the cylinders $a$ of the lower couplets aline vertically with the cylinder $b$ of the upper couplets and such cylinders are subjected to a double motor drive M. The motor drive includes a small motor S for slow speed and a large motor L for higher speeds, said motors being governable by the controller shown in Fig. 4 for starting and regulating the press to maximum speed.

It will thus be apparent that the several couplets, which are necessarily heavy, constitute the approximate centers of inertia of the press and in accordance with the braking scheme hereinafter set forth the several pairs of couplets are provided with individual brakes 8 each acting upon a cylinder of both couplets comprising its respective pair. Accordingly such brakes will distribute the braking strains and it should here be noted that the brakes act directly upon the parts having the greatest kinetic energy thereby shunting the driving gears and connections between said parts and the motor drive and eliminating the effects of back lash.

Each brake 8 of Fig. 1 is of conventional mechanical construction and is provided with springs 9 to effect release thereof while provided with a torque motor 10 for applying the same through suitable connections such as illustrated. And here it may be noted that the motors 10 are of the series type and of a design so proportioned that their torque will be approximately proportional to the square of the current supplied thereto.

Figure 2:
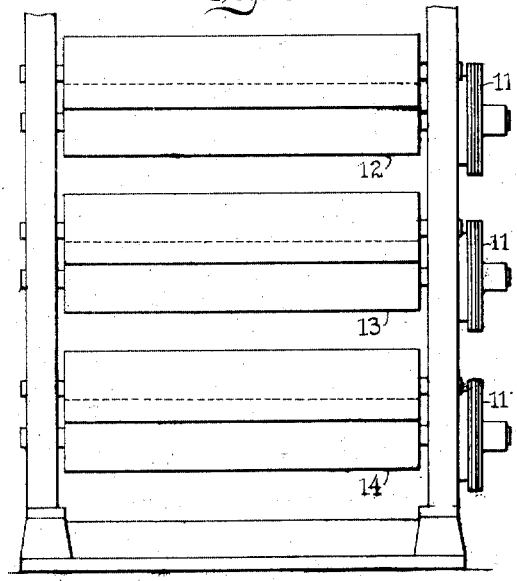
Fig. 2 is a schematic view of a different form of press and alternative braking instrumentalities.
Figure 3:
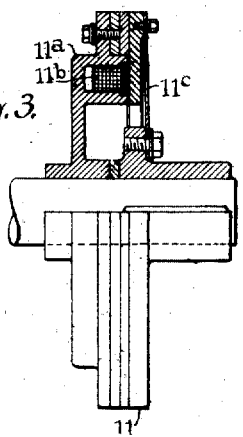
Fig. 3 is an enlarged view, partially in section, of a braking instrumentality of Fig. 2.

Fig. 2 illustrates alternative braking instrumentalities comprising electromechanical brakes 11. The press shown in this figure is of the deck type, with couplets or sets of couplets 12, 13 and 14 arranged one above another and one cylinder of each couplet provided with a brake 11 mounted upon the shaft thereof. The brakes 11 are each of the clutch construction disclosed in my co-pending application, Serial No. 715,718, filed Feb. 4, 1913, now well known, and briefly described each comprises a stationary field member 11$^a$ having an energizing winding 11$^b$ and a biased armature member 11$^c$ fixed to the cylinder shaft. The field member is so constructed as to maintain a fixed minimum gap between the two members when attracted and in consequence the brake will produce through a wide range of current variations a braking effect approximately proportional to the square of the current supplied thereto, with a resultant characteristic similar to the brakes of Fig. 1.

In addition to the foregoing, braking means are also provided for the web rolls, such means being illustrated only in Fig. 1 although applicable as well to the press shown in Fig. 2. As shown in Fig. 1 each web roll is mounted upon two rollers 15 and 16 suitably connected as by a belt for joint operation and the former having an adjustable braking device 17. Thus as the web roll is revolved in unwinding it will encounter a drag in the braked roller 15 whereby the web withdrawn therefrom will be placed under a tension which may be regulated by the adjustment of the device 17. On the other hand, these rollers 15 and 16 which are normally free to revolve independently of the press are provided with driving connections 18 including an electromagnetic clutch 18$^a$ to establish a drive therefor from one of its respective couplets. The arrangement is such that the roller 16, when so driven, feeds the web at a linear speed bearing a definite relation to the peripheral speed of the press cylinders and preferably at slightly greater speed, for example 2%. Thus the drives for the rollers 15 and 16 may be established at any speed of the press without putting strain upon the webs and said rollers when so driven will maintain the predetermined relation between the linear speed of the web and the peripheral speed of the press cylinders.

Figure 4:
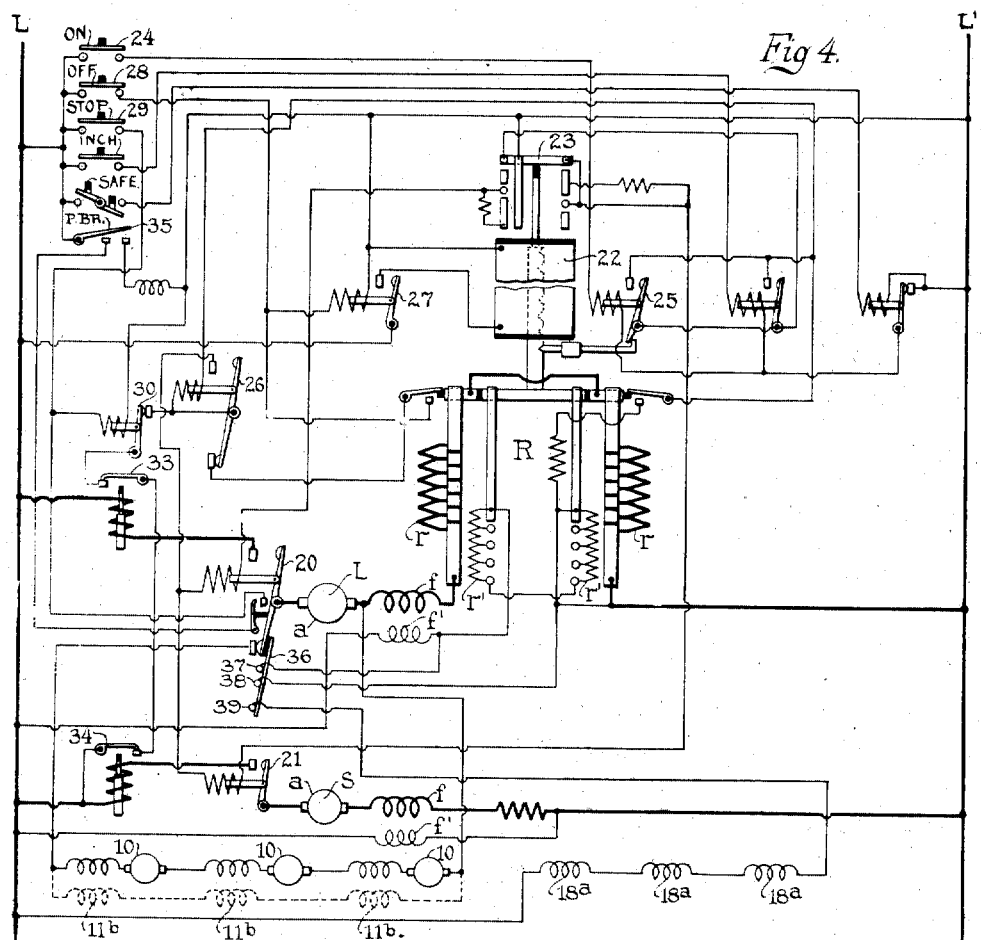
Fig. 4 is a diagrammatic view of a controller applicable to both presses illustrated, and, Fig. 5 is a diagrammatic view of a modification of the controller shown in Fig. 4.

The controller illustrated in Fig. 4, is, as stated, applicable to the equipments illustrated in both of Figs. 1 and 2 and provides for the usual control of the two motor drive and also for the desired control of the braking instrumentalities described. This controller is generally of conventional form and a full description of the features thereof not specifically described herein will be found in Patent No. 1,176,542, issued March 21, 1916.

In Fig. 4 the motors L and S are diagrammatically illustrated as of the compound type, each being provided with an armature $a$, a series field winding $f$, and a shunt field winding $f'$ and the controller is provided with separate electro-magnetic switches 20 and 21 to control the continuity of circuit of said motors. The controller is further provided with a rheostat R of the cross head type for controlling armature resistances $r$ and field resistances $r'$ for the large motor L. This rheostat descends by gravity to progressively cut out the armature resistances and insert the field resistances to accelerate the large motor and is adapted to be raised by a solenoid 22 to decelerate said motor. The small motor is provided only for starting and for slow speed operation of the press and the controller is accordingly not provided with speed regulating means therefor. The operation of the main switches and of the rheostat is controlled by a push button station through a number of electro-responsive relays, and the rheostat is provided with an auxiliary contact member 23 coöperating with a number of contacts to subject the main switches of the two motors to control thereby.

The push button station includes an "on" switch 24 adapted to energize a relay 25 to release the rheostat cross head for descent. Such operation of the cross head initially effects response of the main switch 21 of the small motor thereby setting said small motor in operation for starting the press. Continued descent of the rheostat cross head energizes main switch 20 to thereby start the large motor for a higher speed of the press and thereupon deënergizes switch 21 to disconnect the small motor from circuit. Thereafter descent of the rheostat cross head accelerates the large motor as above described and said cross head is adapted to be checked in any desired speed regulating position by release of the "on" switch. The rheostat effects energization of the motor switches through an electro-responsive relay 26 and said relay upon opening deënergizes both motor switches and energizes a relay 27. Relay 27 in turn energizes solenoid 22 to return the rheostat cross head to initial position. The push button station also includes an "off" switch 28 to energize relay 27 for return of the cross head to any predetermined position and with a "stop" switch 29 adapted to energize a relay 30 to in turn deënergize relay 26, with the result above described. Other control switches are also provided but it is unnecessary to consider the same herein.

Thus provision is made for starting and disconnecting from circuit both motors and in this connection it is to be noted that means are provided for automatically disconnecting the motors under predetermined conditions. Such means includes overload switches 33 and 34 responsive to overloads in the circuits of motors S and L respectively and responsive to deënergize the main relay 26 to thereby effect deënergization of both motor switches as above described. Also, the automatic means includes a so-called "paper break" switch 35 which upon operation energizes the stop relay which, as above stated, also effects deënergization of the main relay 26. Cutting off power and braking upon unexpected contingencies is as essential as braking at will and it is to be noted that the automatic devices described will operate automatically to care for the contingency of web breakage or overload.

Referring now to the braking instrumentalities, the series brake motors 10 of Fig. 1 are shown in full lines while the windings 11ᵇ of the alternative brake of Fig. 2 are shown in dotted lines and the controller is designed to connect said windings across the armature terminals of the large motor. This is accomplished by "down" contacts of switch 20 and it will be observed that with the windings so connected they will be subjected to the potential generated by the large motor when its armature is disconnected from circuit and overhauled by the press. Accordingly the brake applying means whether of the torque motor or electromagnet type will be subjected to a potential approximately proportional to the speed of the press. The current take will be proportional to the applied potential and as above stated either type of brake will produce a braking effect approximately proportional to the square of the current taken. On the other hand, the kinetic energy of the press is proportional to the square of the speed thereof. Therefore it will be observed that the windings 10 or 11ᵇ will apply their respective brakes with an intensity approximately proportional to the kinetic energy of the parts to be braked and in so doing will insure an initial braking effect commensurate to the kinetic energy of the press irrespective of its speed. Moreover, with the braking effect distributed as described, the initial braking shocks and strains will be reduced to a minimum and by reason of the established relation between the brakes and the inertia of the press a gradual but positive slow down is insured, a high mean braking effect being maintained throughout the period of slow down.

With the motor subjected to field regulation as described, means are preferably provided to insure full field strength of the motor during braking period. To this end, the main switch 20 of the large motor is provided with an auxiliary contact 36 adapted upon deënergization of said switch to bridge contacts 37 and 38 to short-circuit all field resistance. Thus whenever the press is to be braked the shunt field winding of the large motor is insured a connection directly across the line for maximum strength which makes the potential generated by the motor L proportional to the press speed.

Referring now to the clutch windings 18ª of the braking mechanism for the web rolls, the same are shown as connected in series and to be energized by connection across the line. The windings are permanently connected to the left hand side of the line and connection to the other side of the line is afforded by the auxiliary contact 36 of the large motor switch 20 through the bridging of contacts 39 and 38. The latter contact is connected to the right hand side of the line while the latter is connected to the windings 18ª. Thus windings 18ª are insured energization immediately upon disconnection of the large motor from circuit with the result of establishing the press drive for the rollers 15 and 16 substantially simultaneously with the establishment of braking connections. Obviously, therefore, with the excess speed provided for the web rolls by the driving connections, said connections may be established without strain on the moving web. Then when the drives are established the rolls will be subjected to the same smooth braking action as the press with an ample provision for slack to insure against breakage of the web.

When the press is finally brought to rest the brakes will inherently release, leaving the press free for restarting. The braking connections including the connections for winding 18ª will remain closed but as will be observed all of such connections will be interrupted by the switch 20 upon responding to restart the large motor.

Figure 5:
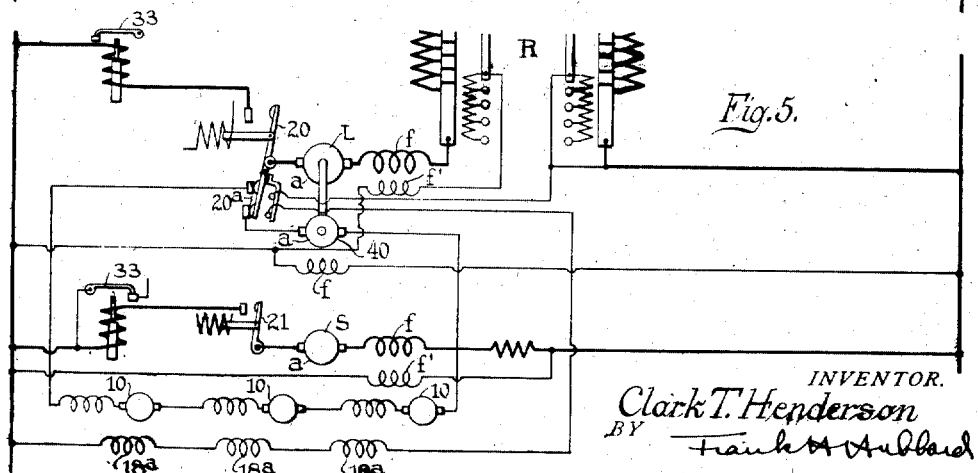

Referring now to Fig. 5 the same illustrates a generator 40 for supplying power to the brakes as an alternative to the use of the driving motor for such purpose. This generator has its armature $a$ coupled to the armature of large motor to be driven thereby and has its field $f$ connected directly across the line. The brake windings are placed in the armature circuit of the generator similarly to the arrangement thereof in the armature loop of motor L and switch 20 is arranged to complete and interrupt the armature circuit of the generator by down contacts 20ᵃ just as it completes and interrupts the armature loop in Fig. 4. Also, switch 20 controls windings 18ᵃ just as described whereby except for the substitution of the generator 40 for the motor L in the supply of power to the brake winding the system will function as already explained. And since the motor L is not required for braking purposes the field strengthening means therefor may be omitted.

What I claim as new and desire to secure by Letters Patent is:

1. In a braking system for machines having a high inertia, in combination, a friction brake for the machine and power means for applying said brake with a varying effect approximately proportional to the kinetic energy of the machine.

2. In a braking system for machines having a high inertia, in combination, a plurality of brakes for parts of the machine located at approximate centers of inertia, and means for applying said brakes with a varying effect approximately proportional to the kinetic energy of the braked parts.

3. In a braking system for machines having a high inertia, in combination, an electro-mechanical brake for the machine adapted to produce a varying braking effect approximately proportional to the square of the current supplied thereto and means for supplying current to said brake whereby its braking effect will vary in approximate proportion with the kinetic energy of the machine.

4. In a braking system for machines having a high inertia, in combination, a plurality of electro-mechanical brakes for parts of the machine located at approximate centers of inertia, each of said brakes producing a varying braking effect approximately proportional to the square of the current supplied thereto and means for supplying current to said brakes in approximate proportion to the speed of the braked parts.

5. In a braking system for machines having a high inertia, in combination, electro-mechanical brakes for different parts of the machine located at approximate centers of inertia and a dynamo-electric machine to supply current to said brakes, said dynamo-electric machine to be driven by the braked machine and said brakes being responsive to the current thereby supplied to effect graduated braking in approximate proportion to the kinetic energy of the braked parts.

6. In a braking system for motor driven machines having a high inertia, in combination, a driving motor for the machine, a plurality of electro-responsive brakes for parts of the machine located at approximate centers of inertia, said brakes being functionally responsive in approximate proportion to the square of the current supplied thereto and means for subjecting said brakes to the potential generated by said motor when driven by said machine, said motor when so driven being adapted to supply said brakes with a current insuring a braking effect approximately proportional to the kinetic energy of said machine.

In witness whereof, I have hereunto subscribed my name.

CLARK T. HENDERSON.